(12) United States Patent
Kim et al.

(10) Patent No.: US 9,536,133 B2
(45) Date of Patent: Jan. 3, 2017

(54) DISPLAY APPARATUS AND CONTROL METHOD FOR ADJUSTING THE EYES OF A PHOTOGRAPHED USER

(71) Applicant: SAMSUNG ELECTRONICS CO., LTD., Suwon-si (KR)

(72) Inventors: Do-wan Kim, Suwon-si (KR); Sung-yeol Kim, Suwon-si (KR); Sung-jin Kim, Suwon-si (KR); Ju-hee Kim, Suwon-si (KR); Jin-sung Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 283 days.

(21) Appl. No.: 14/150,265

(22) Filed: Jan. 8, 2014

(65) Prior Publication Data

US 2015/0009123 A1   Jan. 8, 2015

Related U.S. Application Data

(60) Provisional application No. 61/750,536, filed on Jan. 9, 2013.

(30) Foreign Application Priority Data

May 29, 2013   (KR) ........................ 10-2013-0061214

(51) Int. Cl.
*G06K 9/00* (2006.01)
*G06T 19/00* (2011.01)

(52) U.S. Cl.
CPC ....... *G06K 9/00268* (2013.01); *G06K 9/00208* (2013.01); *G06T 19/00* (2013.01)

(58) Field of Classification Search
CPC ............ G06K 9/00208; G06K 9/00221; G06K 9/00268; G06T 19/00
See application file for complete search history.

(56) References Cited

U.S. PATENT DOCUMENTS

| | | | |
|---|---|---|---|
| 5,500,671 A | 3/1996 | Andersson et al. | |
| 6,753,900 B2 | 6/2004 | Runcie et al. | |
| 6,806,898 B1 | 10/2004 | Toyama et al. | |
| 7,127,081 B1 * | 10/2006 | Erdem | G06K 9/00228 348/169 |
| 7,925,048 B2 * | 4/2011 | Kinoshita | G06K 9/6209 345/419 |
| 8,107,688 B2 * | 1/2012 | Kozakaya | G06K 9/00221 382/117 |

(Continued)

FOREIGN PATENT DOCUMENTS

| | | |
|---|---|---|
| JP | 2000101982 A | 4/2000 |
| JP | 20076016 A | 1/2007 |

(Continued)

*Primary Examiner* — Gregory M Desire
(74) *Attorney, Agent, or Firm* — Sughrue Mion, PLLC

(57) ABSTRACT

A display apparatus is provided. The display apparatus includes a photographing unit configured to photograph the shape of a face; a detector is configured to detect a direction and angle of the face shape; a transformer is configured to mix the photographed face shape and a 3D face model and to transform the mixed face shape by using the detected direction and angle of the face shape; and an output interface is configured to output the transformed face shape.

26 Claims, 10 Drawing Sheets

(56) References Cited

U.S. PATENT DOCUMENTS

| | | | |
|---|---|---|---|
| 8,406,749 B1* | 3/2013 | Gunasekara | H04M 1/247 370/338 |
| 2009/0109400 A1* | 4/2009 | Yoshinaga | A61B 3/113 351/210 |
| 2013/0222644 A1* | 8/2013 | Son | H04N 5/23219 348/239 |
| 2014/0168375 A1* | 6/2014 | Morimura | H04N 7/147 348/46 |
| 2015/0009123 A1* | 1/2015 | Kim | G06K 9/00208 345/156 |
| 2015/0009278 A1* | 1/2015 | Modai | H04N 7/15 348/14.08 |
| 2015/0206354 A1* | 7/2015 | Shibuhisa | H04N 5/23219 348/46 |

FOREIGN PATENT DOCUMENTS

| | | |
|---|---|---|
| JP | 4907470 B2 | 3/2012 |
| KR | 100469727 B1 | 2/2005 |

* cited by examiner (a)

(b)

(c)

DISPLAY APPARATUS AND CONTROL METHOD FOR ADJUSTING THE EYES OF A PHOTOGRAPHED USER

CROSS-REFERENCE TO RELATED APPLICATIONS

This application claims the benefit under 35 U.S.C. §119 (a) of U.S. provisional application No. 61/750,536, filed Jan. 9, 2013 in the United States Patent & Trademark Office, and claims the benefit of Korean Patent Application No. 2013-0061214 filed May 29, 2013 in the Korean Intellectual Property Office, the disclosures of both of which are incorporated herein by reference, in their entirety.

BACKGROUND

1. Field

The exemplary embodiments relate to a display apparatus and a control method thereof. More particularly, the exemplary embodiments relate to a display apparatus and control method that can adjust the eyes of a photographed user.

2. Description of the Related Art

Due to the development of electronic technology and communication technology, electronic devices that can perform a variety of functions have been developed. For example, old TVs only had the ability to output broadcast programs by receiving broadcast signals. However, recent TVs can perform additional functions, such as internet connections, video calls, etc.

A TV may be provided with a camera for video calls. In general, the camera is disposed around the edges of a display unit (e.g. a top edge) of the TV, and a user making video calls looks at other party displayed on a screen rather than viewing the camera. Accordingly, because the camera captures the user with the users eyes directed downward, the user with their eyes direct downward is displayed on the TV of the other party to the video call. Likewise, the user's TV also displays the other party whose eyes are directed downwardly. Accordingly, inconsistency in eyes occurs between the user and the other party, and the inconsistency in eyes works as an element which interferes with the parties immersion during the video calls.

In the past, in order to solve this inconsistency related to the eyes of the parties, mechanical methods, image processing methods, etc. have been used. However, depending on the size of the display device, the mechanical methods to solve such problems are limited. The image processing methods calibrate the direction of gaze of the eyes of a user. However, because the image processing methods of the related art only compensate for the eye areas of a user, there is a problem that a face and the eye of the user are not naturally matched, depending on an angle of the user's face staring at the display apparatus.

Accordingly, the need for technology that can naturally process the captured eyes of the user, regardless of the angle of the users face, has emerged.

SUMMARY

The exemplary embodiments has been developed in order to overcome the above drawbacks and other problems associated with the arrangement of the related art. An aspect of the exemplary embodiments is to provide a display apparatus which can naturally process and output the photographed eyes of the user, and a control method thereof.

The above aspects and/or other features of the exemplary embodiments can be substantially achieved by providing a display apparatus, which may include a photographing apparatus configured to photograph the shape of a face; a detector configured to detect direction and angle of the shape of the face; transformer configured to mix the photographed face shape and a 3D face model, and to transform the mixed face shape by using the detected direction and angle of the shape of the face; and an output interface configured to output the transformed face shape.

The transformer may additionally transform a corresponding face boundary portion of the transformed face shape by using information related to a face boundary portion of the shape of the photographed face.

The detector may extract feature points from the shape of the photographed face, generate a reference 3D face model in the form of a mesh by extracting feature points from a stored reference 3D face model, and may generate a 3D face model in the form of a mesh which corresponds to the shape of the photographed face by projecting the reference 3D face model in the form of a mesh and matching the corresponding feature points.

The detector may detect the direction and angle of the face shape by using a difference in position of predetermined portions of the reference 3D face model and the generated 3D face model.

The transformer may project the predetermined portion of the 3D face model in the form of mesh, and then mix corresponding unit meshes with unit meshes of the photographed face shape in order to generate a mixed face shape in the form of a mesh.

The predetermined portion may include an eye portion.

The transformer may transform the mixed face shape to face a front thereof, i.e., face forward.

The transformer may detect a first boundary which is formed by a predetermined gap inward from the face shape and a second boundary which is formed by a predetermined gap outward from the face shape based on the photographed face shape and the face boundary of the transformed face shape, and may additionally transform a corresponding portion between the first boundary and the second boundary of the transformed face shape by using information related to a portion between the first boundary and the second boundary of the shape of the photographed face.

The display apparatus may include a display configured to display the transformed face shape.

The display apparatus may include a communicator configured to perform at least one of a transmitting function of the transformed face shape data and a receiving function related to the face shape data in which transformation is performed in an external display apparatus.

According to another aspect of the exemplary embodiments, a method of controlling a display apparatus may include photographing a face shape; detecting the direction and angle of the face shape; mixing the photographed face shape and a 3D face model; transforming the mixed face shape by using the detected direction and angle of the face shape; and outputting the transformed face shape.

The transforming the mixed face shape may include additionally transforming a corresponding face boundary portion of the transformed face shape by using information related to a face boundary portion of the shape of the photographed face.

The detecting direction and angle of the face shape may include extracting feature points from the photographed face shape, generating a reference 3D face model in the form of a mesh by extracting feature points from a stored reference 3D face model, and generating a 3D face model in the form of a mesh which corresponds to the photographed face shape by projecting the reference 3D face model in the form of a mesh and matching corresponding feature points.

The detecting direction and angle of the face shape may include detecting the direction and angle of the face shape by using a difference in position of predetermined portions of the reference 3D face model and the generated 3D face model.

The transforming the mixed face shape may include projecting the predetermined portion of the 3D face model in the form of mesh, and then mixes corresponding unit meshes with unit meshes of the photographed face shape in order to generate a mixed face shape in the form of mesh.

The predetermined portion may include an eye portion.

The transforming the mixed face shape may include transforming the mixed face shape to face forward.

The transforming the mixed face shape may include detecting a first boundary which is formed by a predetermined gap that is inward from the face shape and a second boundary which is formed by a predetermined gap outward from the face shape based on the photographed face shape and the face boundary of the transformed face shape, and additionally transforming a corresponding portion between the first boundary and the second boundary of the transformed face shape by using information related to a portion between the first boundary and the second boundary of the shape of the photographed face.

The display method may include displaying the transformed face shape.

The display method may include performing at least one of a transmitting function of the transformed face shape data and a receiving function of face shape data in which transformation is performed in an external display apparatus.

According to various exemplary embodiments, photographed user's eyes may be processed naturally.

An aspect of the exemplary embodiments may provide a display apparatus including: a detector configured to detect a direction and angle of a face shape; and a transformer configured to mix the shape of the face and a reference 3D face model and transform the mixed face shape using the detected direction and angle of the face shape.

The display apparatus may further include a photographing unit configured to photograph the shape of a user face. In addition, the display apparatus may further include an output interface configured to output the transformed face shape.

The transformer may be configured to additionally transform a corresponding face boundary portion of the transformed face shape by using information related to a face boundary portion of the photographed face shape.

The detector may be configured to extract feature points from the shape of the photographed face.

The detector may be configured to generate a reference 3D face model in the form of a mesh by extracting feature points from a stored reference 3D face model.

In addition, the detector may be configured to generate a 3D face model in the form of a mesh which corresponds to the photographed face shape by projecting the reference 3D face model in the form of a mesh and matching the corresponding feature points.

The detector may be configured to detect the direction and angle of the face shape by using a difference in position of predetermined portions of the reference 3D face model and the generated 3D face model.

The transformer may be configured to transform the mixed face shape to face forward.

The display apparatus may further include a display configured to display the transformed face shape.

Other objects, advantages and salient features of the exemplary embodiments will become apparent from the following detailed description, taken in conjunction with the annexed drawings.

BRIEF DESCRIPTION OF THE DRAWINGS

These and/or other aspects and advantages of the exemplary embodiments will become apparent and more readily appreciated from the following description, taken in conjunction with the accompanying drawings of which.

Throughout the drawings, like reference numerals will be understood to refer to like parts, components and structures.

DETAILED DESCRIPTION OF THE EXEMPLARY EMBODIMENTS

Hereinafter, certain exemplary embodiments will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of the exemplary embodiments. Terms that will be described later are defined by considering functions in the exemplary embodiments, so those may be varied depending on the intention of users or operators, practice, etc. Therefore, the definition will be made on the basis of information throughout this specification.

Figure 1:
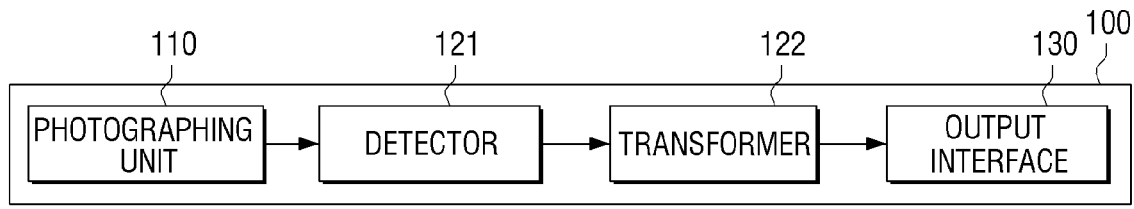
FIG. 1 is a block diagram which illustrates a configuration of a display apparatus according to an exemplary embodiment.

FIG. 1 is a block diagram illustrating a configuration of a display apparatus, according to an exemplary embodiment.

Referring to FIG. 1, the display apparatus 100 includes a photographing unit 110, a detector 121, a transformer 122, and an output interface 130.

The display apparatus 100 includes the photographing unit 110, and may output video. For example, the display apparatus 100 may be implemented as a tablet computer, a personal computer, a notebook computer, a laptop computer, a portable multimedia player (PMP), a personal digital assistant (PDA), a smart phone, a digital photo frame, a digital TV, a monitor, etc.

The photographing unit 110 may be disposed in an outer area of the display apparatus 100. For example, the photographing unit 110 may be disposed at a center of a top edge, a center of left edge, or a center of right edge. In general, a user looks at a center portion (e.g. a screen) of the display apparatus 100. Accordingly, in response to the photographing unit 110 being placed at the center of the top edge of the display apparatus 100, the shape of the eyes of the user being inputted into the photographing unit 110 directs downward.

The photographing unit 110 photographs the shape of a face. The photographing unit 110 includes a lens module containing at least one lens and an image sensor. The shape of the user's face entering through the lens is inputted into the image sensor as an optical signal to play a role in the film, and the image sensor converts the inputted optical signal into an electric signal and transmits the converted electric signal to the detector 121.

The detector 121 detects a direction and angle of the face shape. The display apparatus 100 stores a reference 3D face model. The reference 3D face model refers to a 3D model for a standard type of human face. The detector 121 extracts feature points from the photographed face shape, and matches the extracted feature points with corresponding feature points of the reference 3D face model. In other words, the detector 121 may transform the reference 3D face model by using information related to the photographed face shape. Accordingly, the detector 121 may generate a 3D face model with respect to the shape of the photographed face. The detector 121 may detect a direction and angle of the face shape by comparing the 3D face model with respect to the photographed shape of the face and the reference 3D face model. A detailed process thereof will be described later.

The transformer 122 mixes the photographed face shape and the 3D face model, and then transforms the mixed face shape by using the detected direction and angle of the face shape. Herein, the photographed face shape means a face shape in the form of a mesh formed by connecting the extracted feature points. The 3D face model means a 3D face model with respect to the photographed face shape which the detector 121 generates by transforming the reference 3D face model by using information related to the shape of the photographed face. Mixing of the 3D face model is a process used to calibrate the face shape, and is performed in a way of projecting the 3D face model on the face shape in the form of mesh and matching feature points or unit meshes.

The mixing of the 3D face model may be performed with respect to the entire face. Alternatively, the mixing of the 3D face model may be performed only for a certain portion of the face. For example, the transformer 122 may extract an eye portion of the 3D face model, and may mix the extracted eye portion with the photographed face shape in the form of the mesh by projecting the extracted eye portion. The transformer 122 transforms the mixed face shape based on the detected direction and angle information.

The output interface 130 outputs the transformed face shape. The output interface 130 transmits the transformed face shape data to a different configuration for the output. The different configuration for the output may output the transformed face shape.

Figure 2:
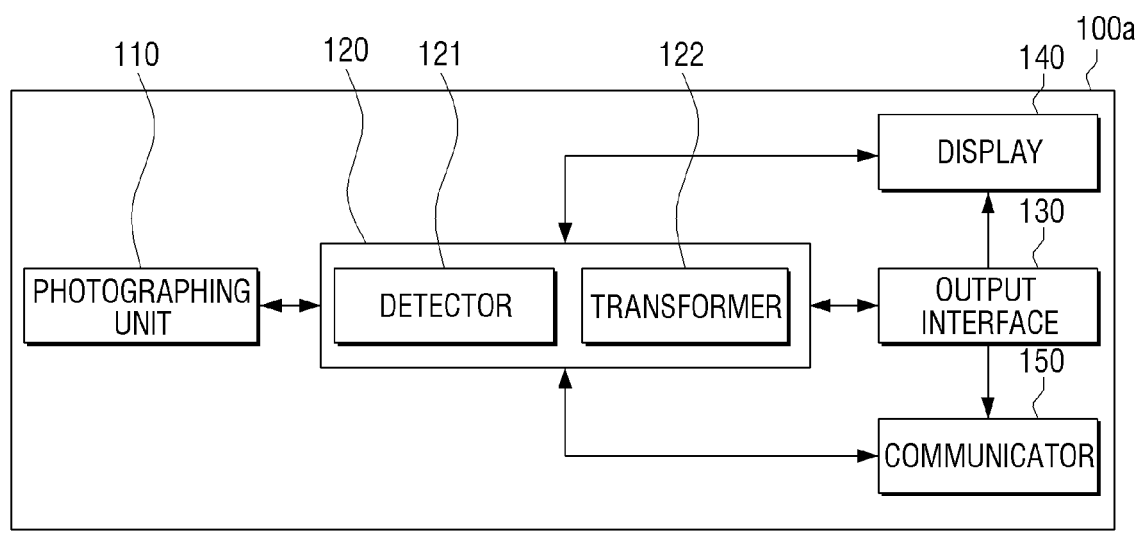
FIG. 2 is a block diagram which illustrates configuration of a display apparatus according to another exemplary embodiment.

FIG. 2 is a block diagram which illustrates a configuration of a display apparatus according to another exemplary embodiment.

Referring to FIG. 2, the display apparatus 100a may include a photographing unit 110, a controller 120, an output interface 130, a display 140, and a communicator 150. The photographing 110 and output interface 130 were described with reference to FIG. 1; therefore, descriptions thereof will be omitted.

The controller 120 may include a detector 121 and a transformer 122. The detector 121 detects a direction and angle of a photographed face shape. The transformer 122 mixes the photographed face shape and a 3D face model, and then transforms the mixed face shape by using the detected direction and angle of the face shape. The detector 121 and transformer 122 may be implemented as a single controller 120. In other words, the detector 121 and transformer 122 may be implemented as a hardware chip or as a software module within the single controller 120.

The controller 120 controls the photographing unit 110, the output interface 130, the display 140, and the communicator 150. The controller 120 may control the output interface 130 and the display 140 in order to display the transformed face shape on a screen. Also, the controller 120 may control the output interface 130 and the communicator 150 in order to transmit the transformed face shape data to other display apparatus (not illustrated). In some cases, the controller 120 may control the output interface 130, the display 140, and the communicator 150 so that the transformed face shape is displayed on the screen, and, at the same time, is transmitted to other display apparatus.

The display 140 may display the transformed face shape. In this case, the user can see a user's own transformed face shape. The display 140 may display a face shape of the other party received through the communicator 150. For example, the displays 140 may implemented as various of displays such as a liquid crystal display (LCD) panel, a plasma display panel (PDP), an organic light emitting diode (OLED), a vacuum fluorescent display (VFD), a field emission display (FED), an electro luminescence display (ELD), etc.

The display 140 may be implemented as a general display panel without a touch input function, or may be implemented as a touch display panel that can recognize user operations by using proximity sensors or touch sensors. In response to the display 140 being implemented as the touch display panel, the display 140 may receive at least one touch gesture through a body of the user (e.g. fingers including a thumb) or through another input means capable of being detected (e.g. a stylus pen).

The communicator 150 may transmit the transformed face shape data to other display apparatus, and may receive face shape data of which transformation was performed in the other display apparatus.

For example, the communicator 150 may include a wireless local area network (LAN) module (not illustrated), a wired local area network (LAN) module (not illustrated), or a local communication module (not illustrated). The wireless LAN module may be connected to the internet in a place where a wireless access point (AP) (not illustrated) is installed, depending on control of the controller 120. The wireless LAN module supports a wireless LAN reference (IEEE 802.11x) of the Institute of Electrical and Electronics Engineers (IEEE). The wired LAN module may be connected to the internet through a wire. The communicator 150 may transmit the transformed face shape data to the other display apparatus through the wireless or wired LAN module.

The local communication module may wirelessly perform local communication between the display apparatus 100a and an external device depending on the control of the controller 120. The local communication method may include Bluetooth®, infrared data association, etc.

So far, the configuration of the display apparatus was described. Hereinafter, a process of photographing the shape of a face of a user and transforming a photographed face shape will be described.

Figure 3:
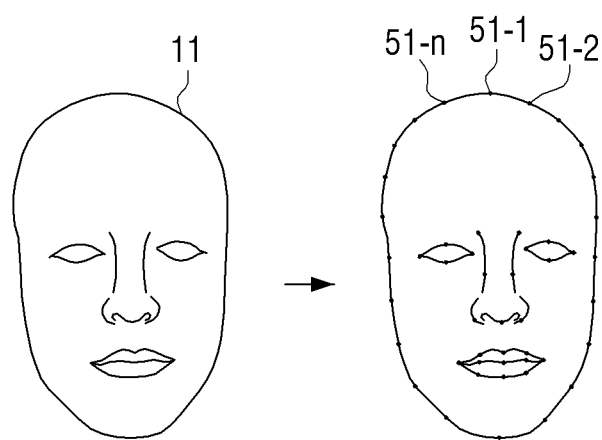
FIG. 3 is a view for explaining extracting feature points from a photographed face, according to an exemplary embodiment.

FIG. 3 is a view for explaining the extraction of feature points from a photographed face, according to an exemplary embodiment.

Referring to FIG. 3, a shape of a user's face 11, photographed by the photographing unit 110, is illustrated. The photographed user's face shape 11 is transmitted to the detector 121. In an exemplary embodiment, an active appearance model (AAM) may be used to detect the feature points. The active appearance model is a computer vision algorithm designed to match a statistical model of an object shape and an appearance of a new image. Such an algorithm uses differences between a current measurement appearance and a target image for driving an optimizing process.

The detector 121 extracts feature points 51-1, 51-2, and 51-$n$ from the user's face shape 11. For example, the detector 121 may find 88 points of location information with respect to eyes, eyebrows, a nose, an upper lip, a lower lip, and a jaw line of the user's face shape 11, and then tracks the feature points in real time. Also, the detector 121 detects the face shape by using a total of five AAM models to which four AAM models are added depending on the left/right angles, in addition to a front face.

Also, the detector 121 generates a 3D face model in the form of a mesh by extracting feature points from a stored reference 3D face model.

Figure 4:
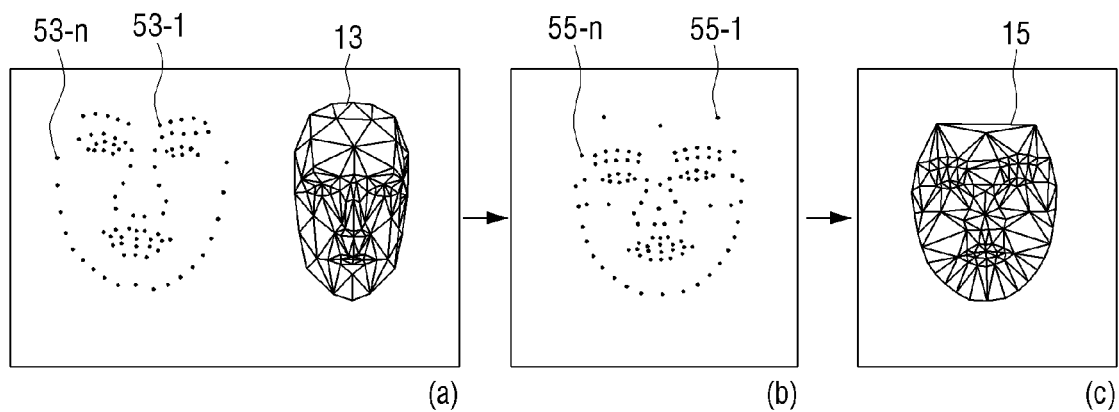
FIG. 4 is a view for explaining a process of generating a 3D face model, according to an exemplary embodiment.

FIG. 4 is a view for explaining a process of generating a 3D face model according to an exemplary embodiment.

FIG. 4(a) illustrates a face shape model from which feature points 53-1 and 53-$n$ are extracted, and illustrates a reference 3D face model 13. The reference 3D face model 13 is implemented as a 3D face shape of an average person. Since the reference 3D face model represents the face shape of the average person, the reference 3D face model may be used regardless of the photographed user.

For example, the reference 3D face model 13 constitutes 190 mesh triangles (or unit meshes) with 113 3D mesh points. The mesh points are points extracted from the eyes, eyebrows, nose, upper lip, lower lip, etc. of the face shape. The mesh triangle means a triangular shape made by connecting three mesh points (or feature points). The mesh points and mesh triangles are used as a basic unit for generating an image in which the user's eyes are adjusted. The reference 3D face model 13 may be regenerated by the extracted mesh points and the mesh triangles to connect the mesh points. The reference 3D face model 13 is generated in such a way to become a reference 3D face model in the form of a mesh. Feature points may be extracted from the photographed face shape 11, and the extracted feature points may be generated in the form of mesh so that the face shape generated in such a way becomes a face shape in the form of a mesh.

FIG. 4(b) illustrates a model in which the mesh points of the reference 3D face model 13 and the feature points of the face shape are matched. Since the reference 3D face model is three dimensional (3D), the mesh points may be projected onto a flat surface. The projected mesh points are matched to the feature points of the corresponding face shape. For example, a left end mesh point of a left eye within the reference 3D face model 13 is matched with a corresponding feature point of the face shape, and a right end mesh point of a right eye within the reference 3D face model 13 is matched with a corresponding feature point of the face shape. In the same way, a face shape model including matched feature points 55-1 and 55-$n$ is generated.

FIG. 4(c) illustrates a 3D face model 15 in the form of mesh. As explained in FIG. 4(b), the 3D face model 15 in the form of a mesh may be generated from the face shape including the matched feature points 55-1 and 55-$n$. In other words, the 3D face model 15 in the form of a mesh is a face model of adjusting the reference 3D face model 13 to be matched with the photographed user's face shape. The 3D face model may be generated by considering error between the 2D photographed user's face shape and the 3D reference face model.

For example, a Gaussian-Newton iterative updating process may be performed. In other words, the 3D face model 15 is generated by totally considering an error (E2D) between a 2D average model of the photographed image and modified appearance, an error (E3D) between a 2D shape and a shape of the reference 3D face model projected on the 2D, an error (Etexture) between modified texture of the photographed image and reference texture of a key frame, and distance features (Epoint) between the present frame and previous frame.

FIG. 4 is explained with respect to one image, but this process may be performed continuously in real time. The direction and angle of the shape of the photographed face may be detected from the 3D face model 15 generated in FIG. 4.

Figure 5:
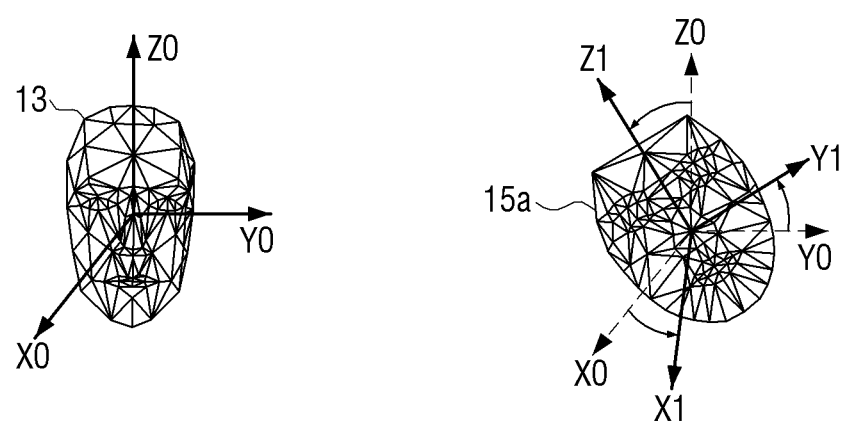
FIG. 5 is a view for explaining a process of detecting a direction and angle of a face shape, according to another exemplary embodiment.

FIG. 5 is a view for explaining a process of detecting a direction and angle of a face shape, according to an exemplary embodiment.

Referring to FIG. 5, the reference 3D face model 13 and the generated 3D face model 15a are illustrated. The generating process of the 3D face model 15a was described in FIG. 4. The generated 3D face model 15a includes information related to the shape of the photographed face. In other words, in response to the photographed face shape being wider than the reference 3D face model 13, the generated 3D face model 15a may be generated by being transformed wider than the reference 3D face model 13. In response to the photographed face shape being tilted to one side, the generated 3D face model 15a may be generated to be tilted to one side.

Since the reference 3D face model 13 is a standard face model, the reference 3D face model may be a shape which faces the front thereof. Accordingly, the generated 3D face model 15a has X, Y, and Z axis rotations, and location changes and scale changes of X and Y axis based on the reference 3D face model 13. Therefore, the detector 121 may detect a rotation amount of each of roll, pitch, and yaw directions of the generated 3D face model 15a, and thus may detect the direction and angle of the photographed face. Also, in response to the direction of the photographed face being rotated slightly to the left, left face mesh triangles of the generated 3D face model 15a may be represented as being smaller than a corresponding area of the reference 3D face model 13, and right face mesh triangles of the generated 3D face model 15a may be represented as being larger than a corresponding area of the reference 3D face model 13. The direction of the photographed face shape may be detected by comparing areas of mesh triangles of the corresponding areas.

Alternatively, the detector 121 may detect the direction and angle of the shape of the face by using the vertical direction of the nose, the vertical direction of the eye, etc., of the face shape. In other words, the detector 121 may detect the direction and angle of the face by using a difference in positions and vertical directions of predetermined portions (e.g. eyes, a nose, a left face, a right face, etc.) of the reference 3D face model 13 and the generated 3D face model 15*a*.

The display apparatus 100 transforms the photographed face shape by using the detected direction and angle of the face shape. The display apparatus 100 may use only a certain portion of the 3D face model 15*a* before transforming the shape of the photographed face.

Figure 6:
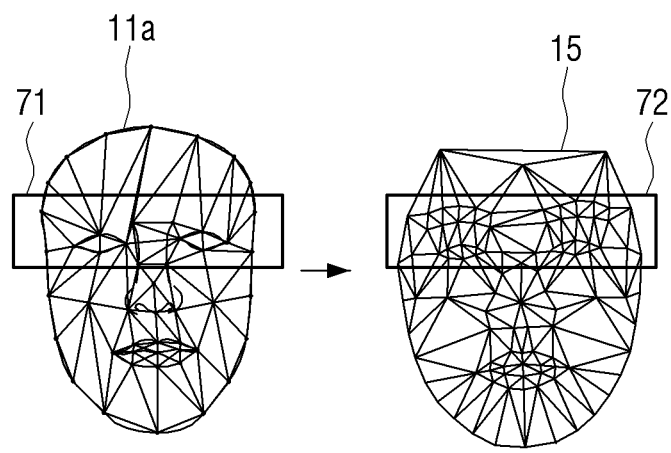
FIG. 6 is a view for explaining a process of mixing a photographed face image and a 3D face model, according to an exemplary embodiment.

FIG. 6 is a view for explaining a process of mixing a photographed face image and a 3D face model according to an exemplary embodiment.

FIG. 6 illustrates a photographed face shape 11*a* in the form of mesh and a generated 3D face shape 15. The transformer 122 may extract information of an eye portion 72 from the generated 3D face shape 15. The transformer 122 may generate a mixed face shape by projecting the extracted eye portion 72 and by mixing corresponding feature points or mesh triangles (or unit nets) of an eye portion 71 of the photographed face shape 11*a*. The transformer 122 may generate a transformed face shape by transforming the mixed face shape depending on the detected direction and angle.

In response to only the two-dimensional (2D) photographed face shape 11*a* being used, the face shape only has information related to the plane. In response to the face shape 11*a* being transformed to look at the front, relatively large change occurs in the eye portion, and relatively little change occurs in one side of the face. In response to partially different changes occurring in the state that the photographed face shape 11*a* has only 2D information as described above, distortion of the eye portion may be worse (e.g. when glasses are worn, the shape of the glasses is distorted).

In response to transforming by only using the generated 3D face shape 15, distortion where an outline of the one side of the face is transformed to be thick is generated as a result of irregularities, ups and downs, etc. of the face shape.

Accordingly, in order to solve the problem of distortion, a mixed face shape in the form of a mesh may be generated by extracting a predetermined portion (e.g. eyes portion) from the generated 3D face model 15 and mixing it with the photographed face shape 11*a*. Thereafter, the transformer 122 may generate a transformed face shape by transforming the shape of the mixed face. For example, the transformer 122 may transform the shape of the mixed face so that the face shape and eyes face forward.

The display apparatus 100 may perform additional transformation in order to generate a more natural face shape.

Figure 7:
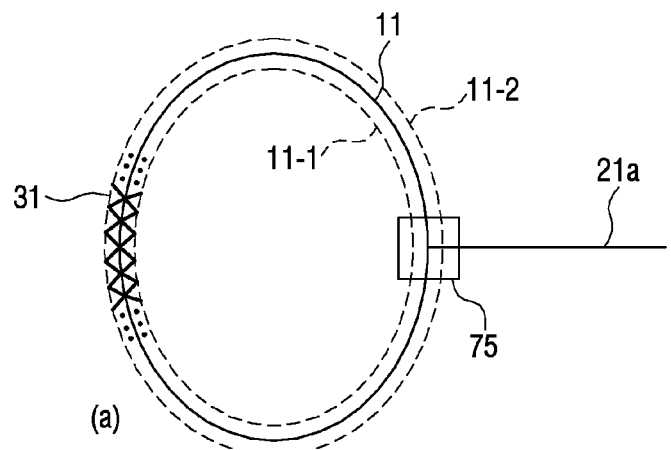
FIG. 7 is a view for explaining additional transformation of a face boundary portion, according to an exemplary embodiment.
Figure 7:
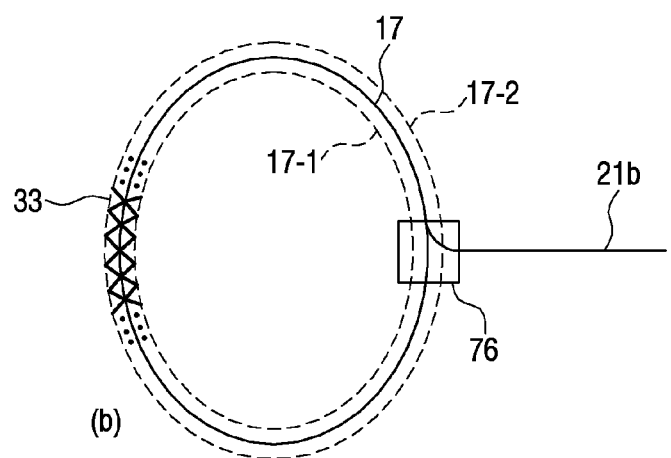
Figure 7:
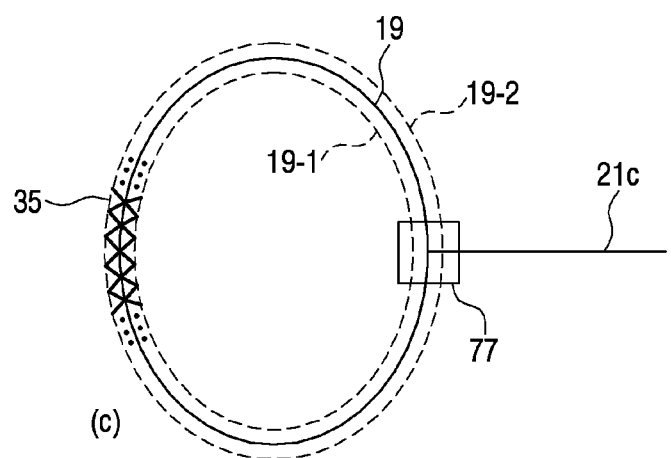

FIG. 7 is a view for explaining additional transformation of a face boundary portion according, to an exemplary embodiment.

FIG. 7(*a*) is a view which illustrates the shape of a photographed face. The transformer 122 may generate virtual boundaries at positions spaced apart by a certain distance inward and outward from a facial contour 11 of the photographed face shape. For example, the certain distance may be set as a point spaced 1 mm or 10 pixels apart from the facial contour 11. The boundaries as illustrated in FIG. 7(*a*) are formed by connecting the points that are spaced a certain distance. For convenience of description, a boundary that is generated inside the face shape is called as a first boundary 11-1, and a boundary that is generated outside the face shape is called as a second boundary 11-2.

Feature points are extracted from the facial contour 11, the first boundary 11-1, and the second boundary 11-2 of the photographed face shape, and then the extracted feature points are connected to generate a shape including mesh triangles (or unit meshes) 31. The feature points and mesh triangles 31 may be formed continuously along the contour 11 of the face shape. Alternatively, the feature points and mesh triangles may be formed on the face shape as a whole. In other words, a face shape in the form of mesh may be generated.

A horizontal line 21*a* illustrated in one side of the face shape refers to a background. To photograph a face shape refers to photographing an area in which the face shape is included, but does not refer to photographing only the face shape separated from the area. Accordingly, a background image may be contained in the top, bottom, left and right sides of the face shape. In other words, the horizontal line 21*a* illustrated horizontally in the one side of the face shape refers to a background image which is not distorted in the photographed image. In other words, a horizontal line area 75 which is in contact with the face shape is represented perpendicular to a tangent of the face shape.

FIG. 7(*b*) is a view which illustrates a transformed face shape. FIG. 7(*b*) illustrates a contour 17, a first boundary 17-1, a second boundary 17-2, feature points, and mesh triangles 33 of the transformed face shape. The contour 17, first boundary 17-1, second boundary 17-2, feature points, and mesh triangles 33 of the transformed face shape are the same as those of FIG. 7(*a*). Therefore, descriptions thereof will be omitted.

A horizontal line 21*b* illustrated in one side of the face shape refers to a background. However, the background illustrated in FIG. 7(*b*) includes a little distorted area 76. In other words, since a transforming process for the face shape was performed, the horizontal line 21*b* which is in contact with the face contour 17 is represented to be distorted. Looking around the distorted area 76, the distortion starts from near the second boundary 17-2, and the most sever distortion occurs in the vicinity of the face shape contour 17. Accordingly, the transformer 122 may perform additional transformation by using portion information of the first and second boundaries 11-1 and 11-2 of the original photographed shape of the face.

FIG. 7(*c*) is a view which illustrates a shape of the face that is additionally transformed. FIG. 7(*c*) illustrates a contour 19, a first boundary 19-1, a second boundary 19-2, feature points, and mesh triangles 35 of the additionally transformed face shape. A horizontal line 21*c* which corresponds to a background and an additionally distorted area 77 are illustrated therein.

The horizontal line 21*a* of the outside background of the original photographed face shape is represented by a straight line. Accordingly, the transformation unit 122 may naturally represent the area 77 of the additionally distorted horizontal line 21*c* by replacing the area 76 of the distorted horizontal line 21*b* with the area 75 of the horizontal line 21*a* which corresponds to the background of the original face shape. The first and second boundaries may be set depending on the screen size, etc. of the display apparatus 100. The horizontal line 21*c* which corresponds to the background image of the additionally transformed face shape is not to be ideally transformed. However, since the user looks at the shape of the face being displayed from a point spaced a certain distance apart from the display apparatus 100, the user can almost not detect the distortion of the horizontal line 21c.

In FIG. 7, additional transformation for an area between the face contour and the second boundary was described. However, in the same way, an additional transformation may be applied to an area between the first boundary and the face contour.

Figure 8:
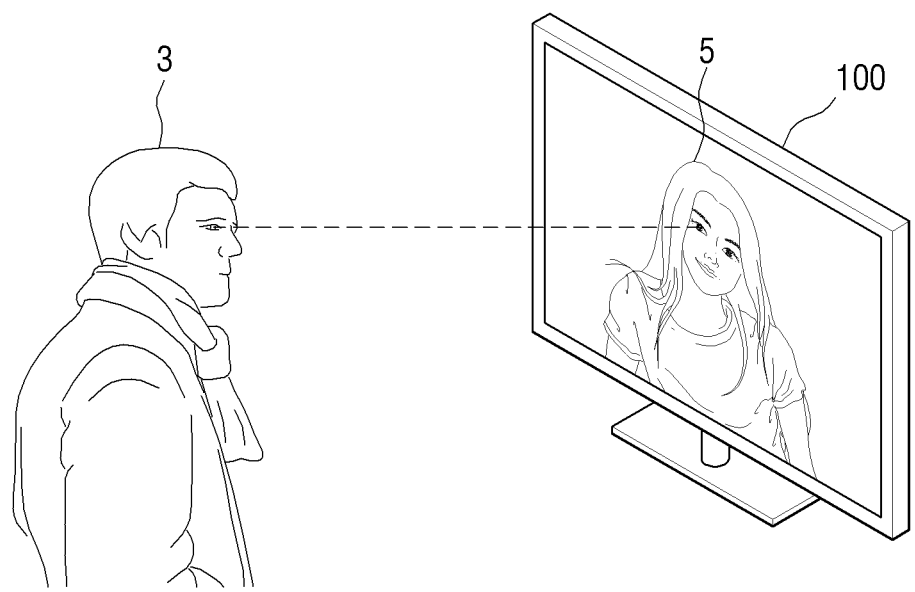
FIG. 8 is a view for explaining a display apparatus that processes and outputs user's eyes according to an exemplary embodiment.

FIG. 8 is a view for explaining how a display apparatus outputs by processing a user's eyes according to an exemplary embodiment.

Referring to FIG. 8, a display apparatus 100 that displays a transformed face shape and a user 3 performing a video call are illustrated. In FIG. 8, an external display apparatus (not illustrated) performs transformation of a face shape of the other party and transmits it to the display apparatus 100 through a communicator. The display apparatus 100 displays the transmitted transformed face shape 5 of the other party. Also, the display apparatus 100 may photograph the shape of the user's face, transform the photographed face shape, and transmit the transformed face shape to the external display apparatus through a communicator or display the face shape through a display.

In FIG. 8, the photographing unit is disposed at a center of a top edge of the display apparatus 100. In response to the external display apparatus having a photographing unit disposed at the same position, the external display apparatus photographs the face shape of the other party of which eyes are directed downward. The external display apparatus transforms the face shape through the above-described process, and transmits the transformed face shape to the display apparatus 100. The display apparatus 100 displays the face shape 5 of the other party which looks at the front of the display apparatus.

Accordingly, since the user may feel matched to the eyes of the other party being displayed, but may almost feel no distortion of the background, the user may concentrate more on the appearance of the other party when performing actions such as video calls.

Figure 9:
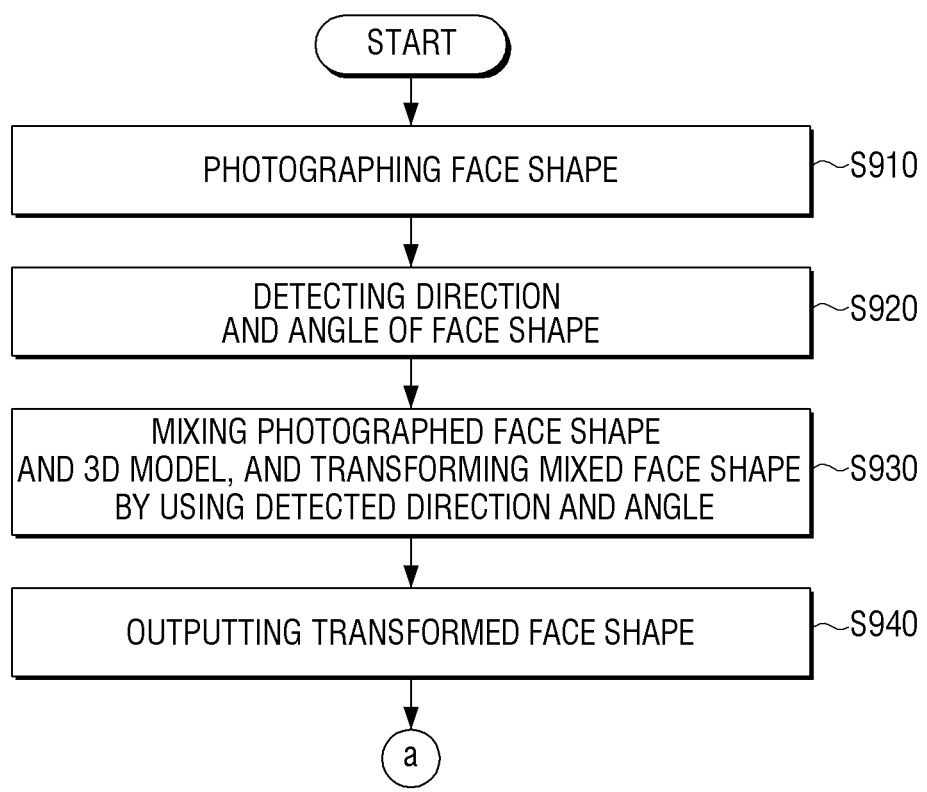
FIG. 9 is a flowchart of a method of controlling a display apparatus, according to an exemplary embodiment.

FIG. 9 is a flowchart of a method of controlling a display apparatus according to an exemplary embodiment.

Referring to FIG. 9, a display apparatus photographs the shape of a face (S910). The display apparatus detects a direction and angle of the face shape (S920). The display apparatus may extract feature points from the photographed face shape. The display apparatus stores a reference 3D face model, and generates a reference 3D face model in the form of a mesh by extracting feature points (or mesh points) from the reference 3D face model. The display apparatus projects the reference 3D face model, and matches it with corresponding feature points of the photographed face shape so as to generate a 3D face model in the form of mesh. The display apparatus detects the direction and angle of the face shape by comparing the reference 3D face model and the generated 3D face model.

The display apparatus mixes the photographed face shape and the 3D model, and transforms the mixed face shape by using the detected direction and angle (S930). The display apparatus extracts a predetermined portion of the generated 3D model, and mixes it to correspond to the photographed face shape. The mixed face shape is transformed depending on the detected direction and angle.

The display apparatus outputs the transformed face shape (S940). The display apparatus may display the transformed face shape through a display. The display apparatus may transmit the transformed face shape data to other display apparatus through a communicator.

Figure 10:
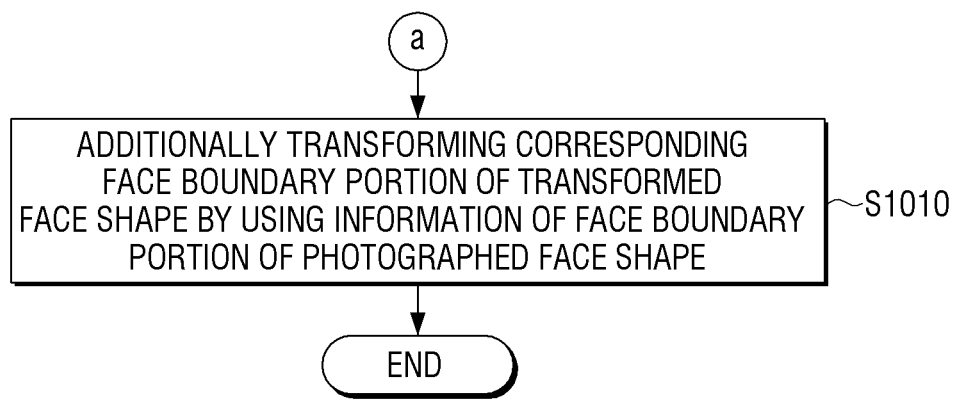
FIG. 10 is a flowchart of a method of controlling a display apparatus, according to another exemplary embodiment.

FIG. 10 is a flowchart of a method of controlling a display apparatus according to another exemplary embodiment. The display apparatus may perform transformation with respect to an area which is in contact with the face shape in addition to transformation of the face shape.

Referring to FIG. 10, the display apparatus may additionally transform a corresponding face boundary portion of a transformed face shape by using information related to a face boundary portion of a photographed face shape (S1010). The display apparatus detects a first boundary which is formed by a predetermined gap inward from the face shape and a second boundary which is formed by a predetermined gap outward from the face shape, based on the photographed face shape and a face boundary of the transformed face shape.

The display apparatus may additionally transform a corresponding portion between the first boundary and second boundary of the transformed face shape by using information with respect to a portion between the first boundary and second boundary of the photographed face shape.

A method of controlling a display apparatus according to a variety of exemplary embodiments may be implemented as a program and may be provided to the display apparatus.

For example, a non-transitory computer-readable storage medium in which a program to perform steps of detecting a direction and angle from a shape of a photographed face, mixing the photographed face with a 3D face model, transforming the mixed face shape by using the detected direction and angle of the face, and outputting the transformed face shape which is stored, may be provided.

Contrary to a medium to store data for a short moment, such as a register, a cache, a memory, etc., the non-transitory computer-readable storage medium refers to a medium that can store data in a semi-permanent manner and that can be read by devices. In particular, the above-described various applications or programs may be stored in and provided with the non-transitory computer readable medium such as a CD, a DVD, a hard disc, a Blu-ray Disc™, USB, a memory card, a ROM, etc.

While the exemplary embodiments have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the inventive concepts.

What is claimed is:

1. A display apparatus comprising:
a photographing unit configured to photograph a shape of a user face;
a detector configured to detect a direction and angle of the face shape;
a transformer configured to mix the shape of the photographed face and a 3D face model and transform the mixed face shape by using the detected direction and angle of the face shape; and
an output interface configured to output an image of the transformed face shape,
wherein the transformer transforms the mixed face shape by adjusting a gaze direction in the image so that the gaze direction faces forward.

2. The display apparatus of claim 1, wherein
the transformer is configured to additionally transform a corresponding face boundary portion of the transformed face shape by using information related to a face boundary portion of the photographed face shape.

3. The display apparatus of claim 2, wherein
the transformer is configured to detect a first boundary which is formed by a predetermined gap inward from the face shape and a second boundary which is formed by a predetermined gap outward from the face shape, based on the photographed face shape and the face boundary of the transformed face shape, and
additionally transforms a corresponding portion between the first boundary and the second boundary of the transformed face shape by using information related to a portion between the first boundary and the second boundary of the shape of the photographed face.

4. The display apparatus of claim 1, wherein
the detector is configured to extract feature points from the photographed face shape,
generate a reference 3D face model in the form of a mesh by extracting feature points from a stored reference 3D face model, and
generate a 3D face model in the form of a mesh which corresponds to the photographed face shape by projecting the reference 3D face model in the form of a mesh and matching the corresponding feature points.

5. The display apparatus of claim 4, wherein
the detector is configured to detect the direction and angle of the face shape by using a difference in position of predetermined portions of the reference 3D face model and the generated 3D face model.

6. The display apparatus of claim 4, wherein
the transformer is configured to project the predetermined portion of the 3D face model in the form of a mesh, and then mixes the corresponding unit meshes with unit meshes of the photographed face shape in order to generate a mixed face shape in the form of a mesh.

7. The display apparatus of claim 6, wherein
the predetermined portion comprises an eye portion.

8. The display apparatus of claim 1, further comprising:
a display configured to display the transformed face shape.

9. The display apparatus of claim 1, further comprising:
a communicator configured to perform at least one of a transmitting function of the transformed face shape data and a receiving function of face shape data of which transformation is performed in an external display apparatus.

10. A method of controlling a display apparatus, the method comprising:
photographing a shape of a face;
detecting a direction and angle of the face shape;
mixing the photographed face shape and a 3D face model;
transforming the mixed face shape by using the detected direction and angle of the face shape; and
outputting an image comprising the shape of the transformed face,
wherein the transforming the mixed face shape comprises transforming the mixed face shape by adjusting a gaze direction in the image so that the gaze direction faces forward.

11. The control method of claim 10, wherein
the transforming the mixed face shape comprises additionally transforming a corresponding face boundary portion of the transformed face shape by using information related to a face boundary portion of the photographed face shape.

12. The display method of claim 11, wherein
the transforming the mixed face shape comprises detecting a first boundary which is formed by a predetermined gap inward from the face shape and a second boundary which is formed by a predetermined gap outward from the face shape, based on the photographed face shape and the face boundary of the transformed face shape, and
additionally transforming a corresponding portion between the first boundary and the second boundary of the transformed face shape by using information related to a portion between the first boundary and the second boundary of the shape of the photographed face.

13. The control method of claim 10, wherein
the detecting direction and angle of the face shape comprises extracting feature points from the shape of the photographed face,
generating a reference 3D face model in the form of a mesh by extracting feature points from a stored reference 3D face model, and
generating a 3D face model in the form of a mesh which corresponds to the photographed face shape by projecting the reference 3D face model in the form of the mesh and matching corresponding feature points.

14. The display method of claim 13, wherein
the detecting direction and angle of the face shape comprises detecting the direction and angle of the face shape by using a difference in position of predetermined portions of the reference 3D face model and the generated 3D face model.

15. The display method of claim 13, wherein
the transforming the mixed face shape comprises projecting the predetermined portion of the 3D face model in the form of a mesh, and then mixes corresponding unit meshes with unit meshes of the photographed face shape in order to generate a mixed face shape in the form of a mesh.

16. The display method of claim 15, wherein
the predetermined portion comprises an eye portion.

17. The display method of claim 10, further comprising:
displaying the transformed face shape.

18. The display method of claim 10, further comprising:
performing at least one of a transmitting function of the transformed face shape data and a receiving function of face shape data of which transformation is performed in an external display apparatus.

19. A display apparatus comprising:
a detector configured to detect a direction and angle of a face shape;
a transformer configured to mix the shape of the face and a reference 3D face model and transform the mixed face shape using the detected direction and angle of the face shape; and
an output interface configured to output an image of the transformed face shape,
wherein the transformer transforms the mixed face shape by adjusting a gaze direction in the image so that the gaze direction faces forward.

20. The display apparatus of claim 19, further comprising a photographing unit configured to photograph the shape of a user face.

21. The display apparatus of claim 20, wherein the transformer is configured to additionally transform a corresponding face boundary portion of the transformed face shape by using information related to a face boundary portion of the photographed face shape.

22. The display apparatus of claim 20, wherein the detector is configured to extract feature points from the shape of the photographed face.

23. The display apparatus of claim 22, wherein the detector is configured to generate a reference 3D face model in the form of a mesh by extracting feature points from a stored reference 3D face model.

24. The display apparatus of claim 23, wherein the detector is configured to generate a 3D face model in the form of a mesh which corresponds to the photographed face shape by projecting the reference 3D face model in the form of a mesh and matching the corresponding feature points.

25. The display apparatus of claim 20, wherein the detector is configured to detect the direction and angle of the face shape by using a difference in position of predetermined portions of the reference 3D face model and the generated 3D face model.

26. The display apparatus of claim 19, further comprising: a display configured to display the transformed face shape.

* * * * *